(12) United States Patent
Nguyen et al.

(10) Patent No.: US 11,650,432 B2
(45) Date of Patent: *May 16, 2023

(54) CONTACT LENS

(71) Applicant: Liberty Commercial Imports & Exports Services LLC, San Bernardino, CA (US)

(72) Inventors: Liberty Hai Ho Nguyen, San Bernardino, CA (US); Tim Hung Minh Nguyen, San Bernardino, CA (US)

(73) Assignee: Liberty Commercial Imports & Exports Services LLC, San Bernardino, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/930,869

(22) Filed: Jul. 16, 2020

(65) Prior Publication Data

US 2021/0041721 A1  Feb. 11, 2021

Related U.S. Application Data

(63) Continuation of application No. 16/678,689, filed on Nov. 8, 2019, now Pat. No. 10,725,321.

(60) Provisional application No. 62/850,382, filed on May 20, 2019.

(51) Int. Cl.
*G02C 7/04* (2006.01)

(52) U.S. Cl.
CPC .............. *G02C 7/047* (2013.01); *G02C 7/044* (2013.01); *G02C 7/048* (2013.01)

(58) Field of Classification Search
CPC ......... G02C 7/047; G02C 7/044; G02C 7/048

USPC ..................................................... 351/159.02
See application file for complete search history.

(56) References Cited

U.S. PATENT DOCUMENTS

| | | | |
|---|---|---|---|
| 10,001,660 B1 | 6/2018 | Chow | |
| 2010/0036488 A1 | 2/2010 | de Juan | |
| 2010/0297193 A1* | 11/2010 | Archambeau | B01F 27/2722 977/915 |
| 2013/0077044 A1 | 3/2013 | de Juan | |
| 2013/0278890 A1 | 10/2013 | de Juan | |
| 2019/0307551 A1* | 10/2019 | Peyman | A61F 9/0079 |

(Continued)

FOREIGN PATENT DOCUMENTS

CN         104545790 A  *  4/2015

*Primary Examiner* — Collin X Beatty
(74) *Attorney, Agent, or Firm* — Mintz, Levin, Cohn, Ferris, Glovsky and Popeo, P.C.

(57) ABSTRACT

A contact lens for shaping a cornea of an eye of a patient to treat high cylinder astigmatism may include a peripheral portion, an alignment portion, a treatment portion, a reverse portion, and a staining feature. The peripheral portion may cause migration of epithelial cells from a periphery of a cornea of the eye of the patient towards a center of the cornea of the eye of the patient. The alignment portion may align the contact lens on the cornea. The treatment portion may cause migration of the epithelial cells from the center of the cornea towards the periphery of the cornea. The reverse portion may relieve pressure caused by the migration of the epithelial cells. The staining feature may contact the cornea, thereby reshaping the cornea to treat high cylinder astigmatism. The staining feature may apply a ribbon-shaped staining pattern to the cornea across the contact lens.

20 Claims, 4 Drawing Sheets

(56) References Cited

U.S. PATENT DOCUMENTS

2019/0369415 A1   12/2019   Grant

* cited by examiner

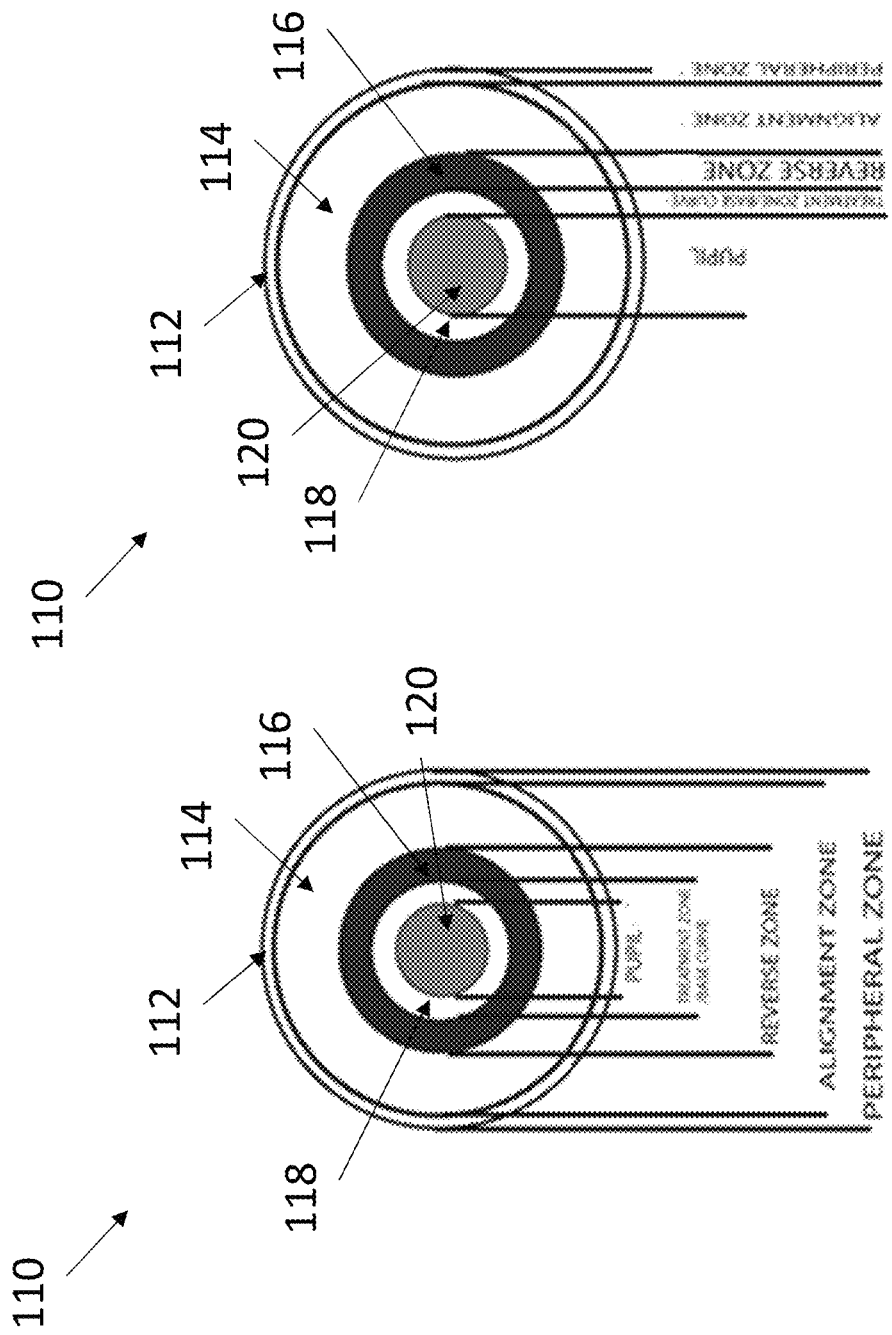

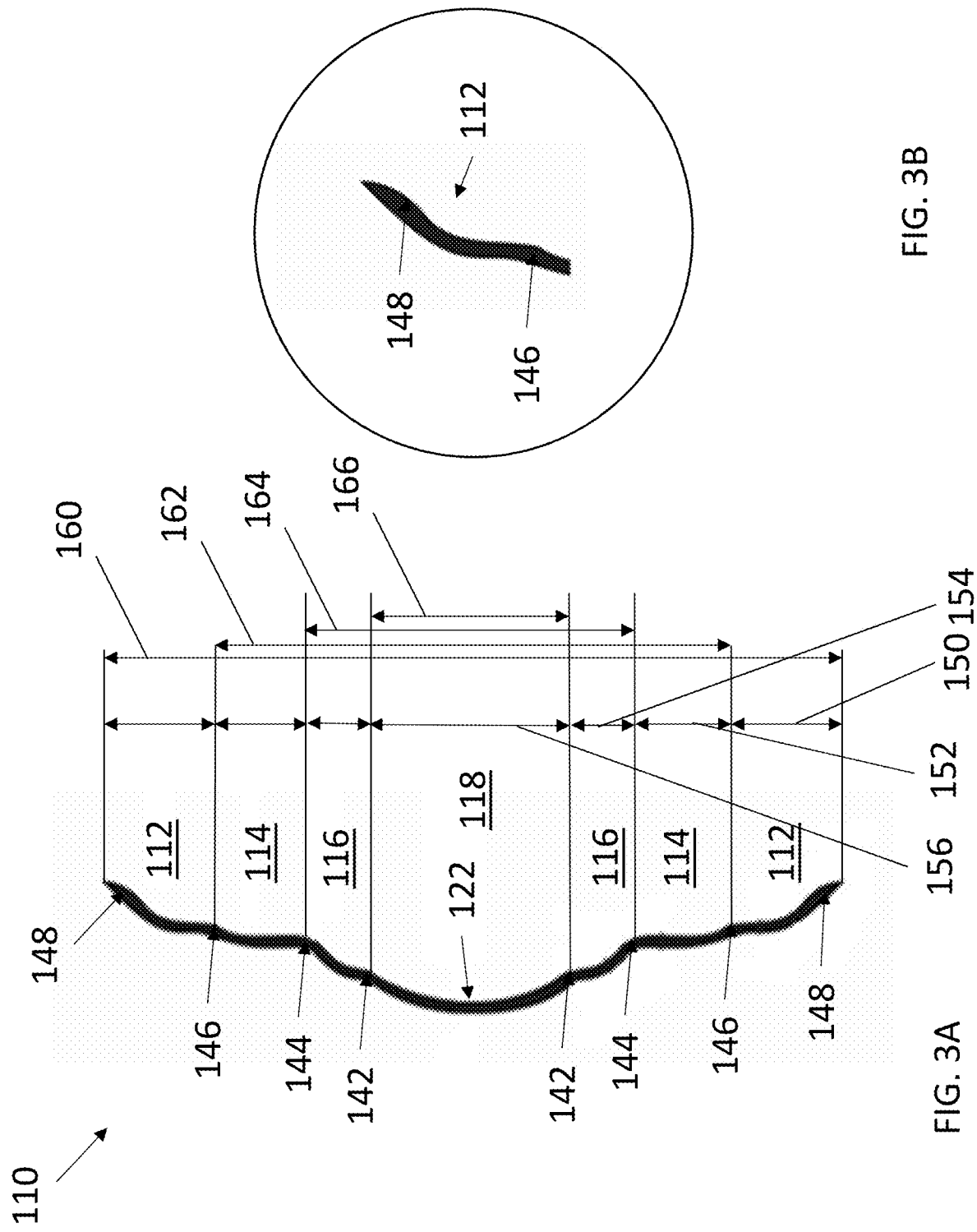

CONTACT LENS

CROSS-REFERENCE TO RELATED APPLICATIONS

The present application is a continuation of U.S. patent application Ser. No. 16/678,689, filed on Nov. 8, 2019, and titled "CONTACT LENS", which claims priority to U.S. Provisional Application No. 62/850,382, filed on May 20, 2019, and titled "CONTACT LENS", the entirety of each of which is incorporated by reference herein.

BACKGROUND

Orthokeratology is generally a non-surgical vision correction method that corrects refractive error. For example, orthokeratology may include a temporary reduction of minimal or no astigmatism that may be achieved by the application of contact lenses to reshape the cornea. However, contact lenses that have generally been used in orthokeratology have only been able to treat patients having no or minimal astigmatism, but have not been capable of treating patients who have high cylinder astigmatism, true corneal astigmatism, crystalline astigmatism, residual (combined) astigmatism), and the like.

SUMMARY

A contact lens is provided for treating ocular disorders including, but not limited to minimal or no astigmatism, high cylinder astigmatism, true corneal astigmatism, crystalline astigmatism, residual (combined) astigmatism, myopia, hyperopia, presbyopia, keratoconus, axial myopia, and the like. The contact lens described herein may additionally or alternatively be used to prevent or reduce progression of collagenous disorders, such as keratoconus, elongation of axial myopia, and the like.

According to some aspects, a contact lens for shaping a cornea of an eye of a patient to treat high cylinder astigmatism is provided. The contact lens may include a peripheral portion, an alignment portion, a reverse portion, a treatment portion and/or a staining feature. The peripheral portion may cause migration of epithelial cells from a periphery of a cornea of the eye of the patient towards a center of the cornea of the eye of the patient. The peripheral portion may extend from an outer edge of the contact lens. The alignment portion may align the contact lens on the cornea. The alignment portion may be positioned adjacent to a first end of the peripheral portion opposite the outer edge of the contact lens. The reverse portion may relieve pressure caused by the migration of the epithelial cells. The reverse portion may be positioned adjacent to a second end of the alignment portion opposite the first end of the peripheral portion. The treatment portion may cause migration of the epithelial cells from the center of the cornea towards the periphery of the cornea. The treatment portion may be positioned adjacent to a third end of the reverse portion opposite the second end of the alignment portion. The staining feature may contact the cornea, thereby reshaping the cornea to treat high cylinder astigmatism. The staining feature may apply a ribbon-shaped staining pattern to the cornea across a diameter of the contact lens.

In some aspects, the peripheral portion, the alignment portion, the treatment portion, and the reverse portion are concave. In some aspects, the staining feature is convex.

In some aspects, the staining feature includes at least four staining features. The at least four staining features may include a first staining feature positioned at a first intersection formed between the treatment portion and the reverse portion, a second staining feature positioned at a second intersection between the reverse portion and the alignment portion, a third staining feature positioned at a third intersection between the alignment portion and the peripheral portion, and a fourth staining feature positioned at the outer edge of the contact lens.

In some aspects, the reverse portion may collect an excess of migrated epithelial cells to relieve pressure caused by the contact between the staining feature and the cornea.

In some aspects, the peripheral portion, the treatment portion, the alignment portion, and the reverse portion are integrally formed. In some aspects, the contact lens includes at least two peripheral portions, at least two alignment portions, and at least two reverse portions. Each of the at least two peripheral portions, each of the at least two alignment portions, and each of the at least two reverse portions may be positioned on opposite sides of the treatment portion. Each of the at least two peripheral portions, each of the at least two alignment portions, and each of the at least two reverse portions may be mirror images of one another about a central axis that extends through a center of the treatment portion.

In some aspects, a width of the peripheral portion is approximately 0.1 mm to 0.5 mm, a radius of curvature of the peripheral portion is approximately 10.0 mm to 13.5 mm, and a Diopter reading of the peripheral portion is approximately 33.75 Diopter to 25 Diopter. In some aspects, a width of the alignment portion is approximately 0.05 mm to 0.40 mm, a radius of curvature of the alignment portion is approximately 8.5 mm to 10.5 mm, and a Diopter reading of the alignment portion is approximately 39.75 Diopter to 32.50 Diopter. In some aspects, a width of the reverse portion is approximately 0.20 mm to 0.80 mm, a radius of curvature of the reverse portion is approximately 6.0 mm to 9.0 mm, and a Diopter reading of the reverse portion is approximately 56.25 Diopter to 37.00 Diopter. In some aspects, a width of the treatment portion is approximately 5.00 mm to 7.50 mm, a radius of curvature of the treatment portion is approximately 6.5 mm to 9.5 mm, and a Diopter reading of the treatment portion is approximately 52.00 Diopter to 35.50 Diopter.

According to some aspects, a method of treating high cylinder astigmatism is provided. The method may include providing a contact lens for shaping a cornea of an eye of a patient to thereby treat the high cylinder astigmatism. The contact lens may include a peripheral portion, an alignment portion, a reverse portion, a treatment portion and/or a staining feature. The peripheral portion may cause migration of epithelial cells from a periphery of a cornea of the eye of the patient towards a center of the cornea of the eye of the patient. The peripheral portion may extend from an outer edge of the contact lens. The alignment portion may align the contact lens on the cornea. The alignment portion may be positioned adjacent to a first end of the peripheral portion opposite the outer edge of the contact lens. The reverse portion may relieve pressure caused by the migration of the epithelial cells. The reverse portion may be positioned adjacent to a second end of the alignment portion opposite the first end of the peripheral portion. The treatment portion may cause migration of the epithelial cells from the center of the cornea towards the periphery of the cornea. The treatment portion may be positioned adjacent to a third end of the reverse portion opposite the second end of the alignment portion. The staining feature may contact the cornea, thereby reshaping the cornea to treat high cylinder astigmatism. The staining feature may apply a ribbon-shaped staining pattern to the cornea across a diameter of the contact lens.

According to one aspect, a contact lens for shaping a cornea of an eye of a patient to treat high cylinder astigmatism may include a peripheral portion, an alignment portion, a treatment portion, a reverse portion, and a staining feature. The peripheral portion may cause migration of epithelial cells from a periphery of a cornea of the eye of the patient towards a center of the cornea of the eye of the patient. The alignment portion may align the contact lens on the cornea. The treatment portion may cause migration of the epithelial cells from the center of the cornea towards the periphery of the cornea. The reverse portion may relieve pressure caused by the migration of the epithelial cells. The staining feature may contact the cornea, thereby reshaping the cornea to treat high cylinder astigmatism. The staining feature may apply a ribbon-shaped staining pattern to the cornea across the contact lens.

In some aspects, the peripheral portion, the alignment portion, the treatment portion, and the reverse portion are concave. In some aspects, the staining feature is convex.

In some aspects, the staining feature includes at least four staining features. In some aspects, the at least four staining features includes a first staining feature, a second staining feature, a third staining feature, and a fourth staining feature. The first staining feature may be positioned between the treatment portion and the reverse portion. The second staining feature may be positioned between the reverse portion and the alignment portion. The third staining feature may be positioned between the alignment portion and the peripheral portion. The fourth staining feature may be positioned at an end of the peripheral portion.

In some aspects, the reverse portion may collect an excess of migrated epithelial cells to relieve pressure caused by the contact between the staining feature and the cornea.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 2A and 2B illustrate front views of an example contact lens, consistent with implementations of the current subject matter;

FIGS. 3A and 3B illustrate side views of an example contact lens, consistent with implementations of the current subject matter.

When practical, similar reference numbers denote similar structures, features, or elements.

DETAILED DESCRIPTION

Orthokeratology is generally a non-surgical vision correction method that corrects refractive error in a patient's eye. For example, orthokeratology may include a temporary reduction of myopia (e.g., astigmatism) that may be achieved by the programmed application of contact lenses to reshape the cornea. The contact lenses may apply a gentle pressure on the patient's cornea to reshape at least a front surface of the cornea. If treatment is discontinued, the patient's cornea generally reverts back to the original shape.

Contact lenses used in orthokeratology have mainly been used to treat patients having no or minimal astigmatism (e.g., a tear film tolerant range up to 1.5 diopter degrees cylinder). But, these contact lenses have not been capable of treating patients who have high cylinder astigmatism, true corneal astigmatism, crystalline astigmatism, or residual (combined) astigmatism), among other forms of astigmatism or ocular diseases. In contrast, a contact lens as described herein may be specifically shaped to treat patient's having minimal or no astigmatism, as well as high cylinder astigmatism (e.g., a tear film tolerant range of greater than or equal to 1.5 diopter degrees cylinder). The contact lens described herein may additionally or alternatively be used to treat true corneal astigmatism, crystalline astigmatism, or residual (combined) astigmatism), myopia, hyperopia, presbyopia, keratoconus, axial myopia, among other ocular disorders. The contact lens described herein may additionally or alternatively be used to prevent or reduce progression of collagenous disorders, such as keratoconus, elongation of axial myopia, and the like. The contact lens described herein may also act as a shield to prevent or reduce the disorder progression by acting against the cornea directly and/or the sclera indirectly.

Figure 1:
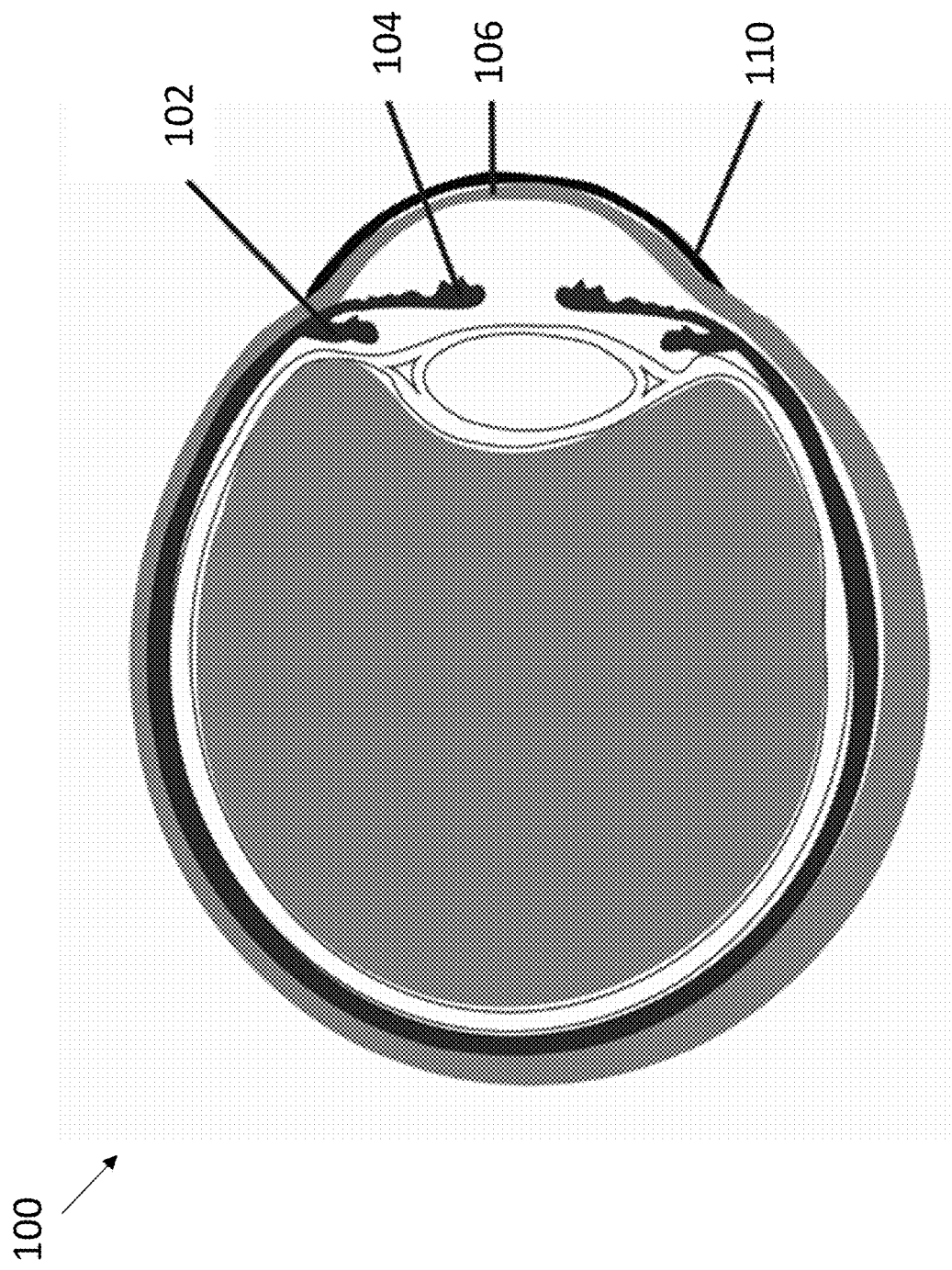
FIG. 1 depicts a schematic diagram of a contact lens applied to an eye of a patient, consistent with implementations of the current subject matter.

FIG. 1 is a schematic diagram of a patient's eye 100, including a ciliary body 102, an iris 104, and a cornea 106. As shown in FIG. 1, a contact lens 110 for treating a patient is positioned over the cornea 106. The contact lens 110 may include a rigid gas-permeable material. In some implementations, the contact lens 110 includes a corneal or corneal-scleral contact lens. The contact lens 110 may be used to treat a patient for temporary vision correction. The contact lens 110 may be applied to the patient's eye (e.g., the patient's cornea) and may be worn by the patient for a period of time, such as during the day and/or overnight.

The contact lens 110 described herein may be used to treat to treat patients having high level of astigmatism, as noted above, by for example, including a high astigmatic zone that is at least 0.50 Diopter steeper relative to other lenses and another zone that is at least 0.5 Diopter steeper relative to other lenses, for example, to increase stability. This configuration helps to push the corneal epithelial cells of the patient's eye from a periphery of the eye to the center of the eye, to provide a stable base for the contact lens 110 to compress and/or adjust the cornea, thereby correcting the high cylinder astigmatism.

FIGS. 2A and 2B illustrate front views of an example contact lens 110 and FIGS. 3A and 3B illustrate side views of the example contact lens 110 consistent with implementations of the current subject matter. The contact lens 110 includes several portions that are specifically designed to provide an improved device for treating ocular disorders, such as high cylinder astigmatism. The topography of the contact lens 110 (e.g., the particular shape and/or size of the portions of the contact lens 110) may be important to ensure that treatment is being applied to the center of the cornea to treat the high cylinder astigmatism. For example, the contact lens 110 includes concave portions, such as a peripheral portion 112, an alignment portion 114, a reverse portion 116, and a treatment portion 118. The treatment portion 118 is configured to be located over at least a pupil 120 of the patient's eye. As shown in FIGS. 2A and 2B, the peripheral portion 112, the alignment portion 114, the reverse portion 116, and the treatment portion 118 are integrally formed and form various portions of the contact lens 110. The size and/or shape of each of the peripheral portion 112, the alignment portion 114, the reverse portion 116, and the treatment portion 118 may vary and/or may depend on a variety of factors, such as a patient's refraction, measurements from an automatic reading machine, a patient's corneal curvature, a desirable target adjustment of the patient, and/or the like. However, as noted below certain sizes and/or shapes of each of the peripheral portion 112, the alignment portion 114, the reverse portion 116, and the treatment portion 118 may be desirable to treat ocular disorders, such as high cylinder astigmatism. In some embodiments, each of the peripheral portion 112, the alignment portion 114, the reverse portion 116, and the treatment portion 118 may each desirably have different widths, diameters, lengths, radii of curvature, and/or other parameters to treat ocular disorders, such as high cylinder astigmatism. As an example, a width of the peripheral portion may be approximately 0.1 mm to 0.5 mm, a radius of curvature of the peripheral portion may be approximately 10.0 mm to 13.5 mm, a Diopter reading of the peripheral portion may be approximately 33.75 Diopter to 25 Diopter, a width of the alignment portion may be approximately 0.05 mm to 0.40 mm, a radius of curvature of the alignment portion may be approximately 8.5 mm to 10.5 mm, a Diopter reading of the alignment portion may be approximately 39.75 Diopter to 32.50 Diopter, a width of the reverse portion may be approximately 0.20 mm to 0.80 mm, a radius of curvature of the reverse portion may be approximately 6.0 mm to 9.0 mm, a Diopter reading of the reverse portion may be approximately 56.25 Diopter to 37.00 Diopter, a width of the treatment portion may be approximately 5.00 mm to 7.50 mm, a radius of curvature of the treatment portion may be approximately 6.5 mm to 9.5 mm, and a Diopter reading of the treatment portion may be approximately 52.00 Diopter to 35.50 Diopter. This configuration may be desirable in some cases to treat high cylinder astigmatism.

In some implementations, the contact lens includes at least two peripheral portions 112, at least two alignment portions 114, and at least two reverse portions 116. Each of the at least two peripheral portions 112, each of the at least two alignment portions 114, and each of the at least two reverse portions 116 may be positioned on opposite sides of the treatment portion 118. In some implementations, each of the at least two peripheral portions 112, each of the at least two alignment portions 114, and each of the at least two reverse portions 116 may be mirror images of one another about a central axis that extends through a center of the treatment portion 118 of the contact lens (or through a center of the contact lens 110). In some implementations, one or more of the at least two peripheral portions 112 forms a peripheral zone, one or more of the at least two alignment portions 114 forms an alignment zone, one or more of the at least two reverse portions 116 forms a reverse zone, and the treatment portion 118 forms a treatment zone/base curve (e.g., see FIGS. 2A-2B). In some implementations, a diameter 160 is a length of the peripheral zone (e.g., see FIGS. 2A-3B). In some implementations, a diameter 162 is a length of the alignment zone (e.g., see FIGS. 2A-3B). In some implementations, a diameter 164 is a length of the reverse zone (e.g., see FIGS. 2A-3B). In some implementations, a diameter 166 is a length of the treatment zone (e.g., see FIGS. 2A-3B).

Figures 4A, 4B:
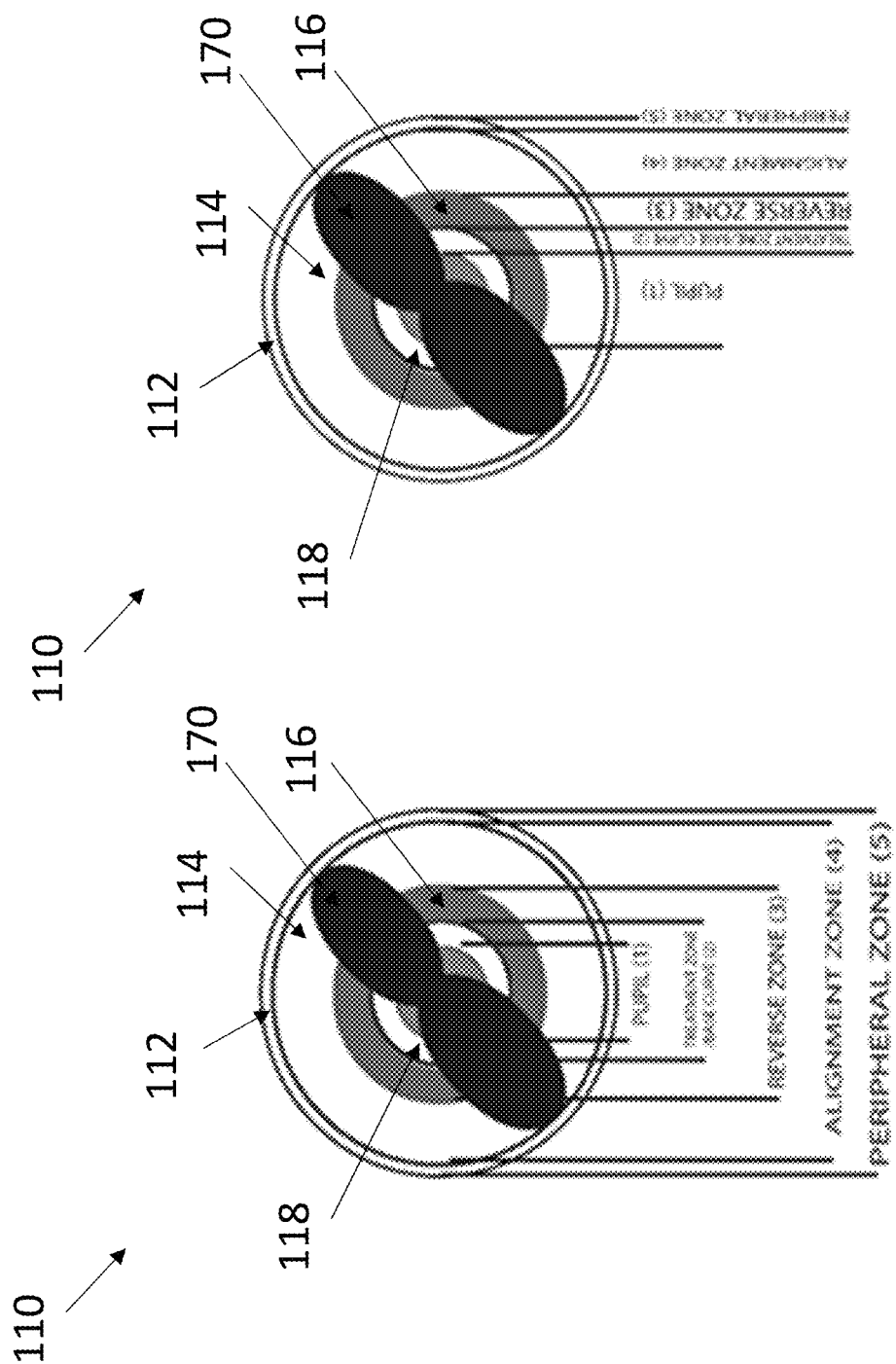
FIGS. 4A and 4B illustrate front views of an example contact lens providing a staining pattern, consistent with implementations of the current subject matter.

Additionally, staining features may be formed between adjacent portions of the contact lens 110. The staining features may form convex features that contact the cornea (or tears/cells formed between the cornea and the contact lens) when worn by the patient to reshape the patient's cornea, thereby treating high cylinder astigmatism. For example, the contact lens 110 may include a first staining feature 142 formed between the treatment portion 118 and the reverse portion 116, a second staining feature 144 formed between the reverse portion 116 and the alignment portion 114, a third staining feature 146 formed between the alignment portion 114 and the peripheral portion 112, and a fourth staining feature 148 formed at an end of the peripheral portion 112. The first, second, third, and fourth staining features 142, 144, 146, 148 may each contact the cornea (e.g., applying a pressure to the cornea) to reshape the cornea, thus beneficially staining the patient's cornea across the entire cornea (and contact lens 110), such as across at least a portion of a diameter of the cornea or contact lens 110. An example of the staining pattern caused by the contact between the first, second, third, and fourth staining features 142, 144, 146, 148 and the patient's cornea is shown in FIGS. 4A and 4B and is described in more detail below.

Referring to FIGS. 2A-3B, the peripheral portion 112 allows for improved tear exchange in the eye and helps to ensure patient comfort. For example, the peripheral portion 112 may be designed to push corneal epithelial cells from the outer periphery of the cornea towards the center (e.g., under the treatment portion 118 of the contact lens 110), such as when the fourth staining feature contacts the cornea. Migration of the corneal epithelial cells from the outer periphery of the cornea towards the center of the eye provides an improved base and improved stability for the contact lens 110 to compress and/or adjust the cornea to thereby achieve a more stable correction of the high cylinder astigmatism.

The peripheral portion 112 of the contact lens 110 may include a width 150 of approximately 0.1 mm to 0.5 mm. In other implementations, the peripheral portion 112 may include a width 150 of approximately 0.1 mm to 0.2 mm, 0.2 mm to 0.3 mm, 0.3 mm to 0.4 mm, and/or 0.4 mm to 0.5 mm, or greater or other ranges therebetween. In some implementations, a diameter 160 of the contact lens 110 from an outer point of each of the peripheral portions 112 may be approximately 9.0 to 12.0 mm. In other implementations, the diameter 160 may be approximately 9.0 mm to 10.0 mm, 10.0 mm to 11.0 mm, 11.0 mm to 12.0 mm, or greater or other ranges therebetween. In some implementations (such as is shown in FIGS. 3A and 3B), the peripheral portion 112 has a radius of curvature of approximately 10.0 to 13.5 mm and has a diopter reading of approximately 33.75 Diopter (10.0 mm) to 25 Diopter (13.5 mm). In other implementations, the radius of curvature of the peripheral portion 112 of the contact lens 110 is approximately 10.0 mm to 10.5 mm, 10.5 mm to 11.0 mm, 11.0 mm to 11.5 mm, 11.5 mm to 12.0 mm, 12.0 mm to 12.5 mm, 12.5 mm to 13.0 mm, 13.0 mm to 13.5 mm or greater or other ranges therebetween. In some implementations, the diopter reading of the peripheral portion 112 contact lens 110 is approximately 33.0 to 30.0, 30.0 to 27.0, 27.0 to 25.0 and/or greater or other ranges therebetween.

Accordingly, the peripheral portion 112 may be approximately 0.5 diopters steeper relative to other contact lenses to encourage and/or allow the corneal epithelial cells to migrate towards the pupil of the eye (e.g., under the treatment portion 118). The steeper peripheral portion 112 may allow for better circulation of tears between the interior surface 122 of the contact lens 110 and the surface of the patient's eye, and may allow for easier removal of the contact lens 110 from the patient's eye, as well as allow for easier removal of debris from between the contact lens 110 and the surface of the patient's eye.

Referring to FIGS. 2A-3B, the alignment portion 114 is located adjacent to and between the peripheral portion 112 and the reverse portion 116. The alignment portion 114 helps to align the contact lens 110 in the proper position along the surface of the patient's eye (e.g., centered on the cornea). For example, when a patient blinks the contact lens 110 may rotate and/or move along the surface of the patient's eye. The alignment portion 114 (and/or the second or third staining features 144, 146) may help to retain the contact lens 110 in the proper position by contacting the cornea, such as at the mid-periphery of the cornea. Retaining the contact lens 110 in the proper position on the patient's cornea may help to provide a more stable and consistent staining pattern, thereby more effectively and efficiently reshaping the patient's cornea to treat the high cylinder astigmatism. Thus, the alignment portion 114 (and/or the reverse portion 116) may help to enhance stability and limit or prevent improper lens rotation, dislodgement, patient discomfort, and the like.

The alignment portion 114 of the contact lens 110 may include a width 152 of approximately 0.05 mm to 0.4 mm. In other implementations, the alignment portion 114 may include a width 152 of approximately 0.05 mm to 0.1 mm, 0.1 mm to 0.15 mm, 0.15 mm to 0.2 mm, 0.2 mm to 0.25 mm, 0.25 mm to 0.3 mm, 0.3 mm to 0.35 mm, and/or 0.35 mm to 0.4 mm, or greater or other ranges therebetween. In some implementations, a diameter 162 of the contact lens 110 from an outer point of each of the alignment portion 114 (e.g., at the intersection between the alignment portion 114 and the peripheral portion 112) may be approximately 8.0 to 11.0 mm. In other implementations, the diameter 162 may be approximately 8.0 mm to 9.0 mm, 9.0 mm to 10.0 mm, 10.0 mm to 11.0 mm, or greater or other ranges therebetween. In some implementations (such as is shown in FIGS. 3A and 3B), the alignment portion 114 has a radius of curvature of approximately 8.5 to 10.5 mm and has a diopter reading of approximately 39.75 Diopter (8.50 mm) to 32.50 Diopter (10.50 mm). In other implementations, the radius of curvature of the alignment portion 114 of the contact lens 110 is approximately 8.5 mm to 9.0 mm, 9.0 mm to 9.5 mm, 9.5 mm to 10.0 mm, and/or 10.0 mm to 10.5 mm, or greater or other ranges therebetween. In some implementations, the diopter reading of the alignment portion 114 of the contact lens 110 is approximately 39.0 to 37.0, 37.0 to 34.0, 34.0 to 32.0 and/or greater or other ranges therebetween.

Referring to FIGS. 2A-3B, the reverse portion 116 is located adjacent to and between the alignment portion 114 and the treatment portion 118. The reverse portion 116 helps relieve pressure from the cornea caused by the contact between the first, second, third, and fourth staining features 142, 144, 146, 148 and the patient's cornea (and/or between the treatment portion 118 and cornea and/or between the peripheral portion 112 and the cornea).

For example, as described herein, the peripheral portion 112 may cause migration of epithelial cells towards the pupil and the treatment portion 118 may cause migration of the epithelial cells towards the periphery of the cornea by applying pressure (e.g., a pushing force) on the cells (and cornea), such as at one or more of the first, second, third, and fourth staining features 142, 144, 146, 148. The reverse portion 116 may relieve the applied pressure (e.g., via a pulling force) by providing a reservoir that collects the excess and/or displaced migrating epithelial cells. The reverse portion 116 may be steeper relative to other contact lenses to allow for a greater amount of pressure to be relieved. In some implementations, the larger reverse portion 116 may help to compensate for the larger (or steeper) peripheral portion 112 and/or treatment portion 118, which applied a greater amount of pressure on the cornea, and thus caused a greater number of epithelial cells to migrate. The larger (or steeper) reverse portion 116 may help to provide a more stable and consistent staining pattern to the patient's cornea, thereby more effectively and efficiently reshaping the patient's cornea to treat the high cylinder astigmatism.

The reverse portion 116 of the contact lens 110 may include a width 154 of approximately 0.2 mm to 0.8 mm. In other implementations, the reverse portion 116 may include a width 154 of approximately 0.2 mm to 0.3 mm, 0.3 mm to 0.4 mm, 0.4 mm to 0.5 mm, 0.5 mm to 0.6 mm, 0.6 mm to 0.7 mm, and/or 0.7 mm to 0.8 mm, or greater or other ranges therebetween. In some implementations, a diameter 164 of the contact lens 110 from an outer point of each of the reverse portions 116 (e.g., at the intersection between the reverse portion 116 and the alignment portion 114) may be approximately 6.5 to 9.5 mm. In other implementations, the diameter 164 may be approximately 6.5 mm to 7.5 mm, 7.5 mm to 8.5 mm, 8.5 mm to 9.5 mm, or greater or other ranges therebetween. In some implementations (such as is shown in FIGS. 3A and 3B), the reverse portion 116 has a radius of curvature of approximately 6.0 to 9.0 mm and has a diopter reading of approximately 56.25 Diopter (6.0 mm) to 37.00 Diopter (9.0 mm). In other implementations, the radius of curvature of the reverse portion 116 of the contact lens 110 is approximately 6.0 mm to 7.0 mm, 7.0 mm to 8.0 mm, 8.0 mm to 9.0 mm, or greater or other ranges therebetween. In some implementations, the diopter reading of the reverse portion 116 of the contact lens 110 is approximately 56.0 to 50.0, 50.0 to 45.0, 45.0 to 40.0, 40.0 to 37.0, and/or greater or other ranges therebetween.

Referring to FIGS. 2A-3B, the treatment portion 118 is located adjacent to the reverse portion 116. In some implementations, the treatment portion 118 (and/or the first staining feature 142), which may also be referred to as the "base curve", is the treatment portion of the contact lens 110 that helps to flatten the cornea, thereby helping to treat the patient. In some implementations, the treatment portion 118 is flatter than the flattest central apical radius of the patient's eye. However, in other implementations, the treatment portion 118 may have a larger curve that the flattest central apical radius of the patient's eye. While the treatment portion 118 may be flatter than the peripheral portion 112, the treatment portion 118 may still be steeper than other contact lenses for better contact lens centration, balance, stability, adjustment, and/or compression. Thus, the treatment portion 118 may be shaped and/or sized depending on various factors, such as the target power for correcting the patient's astigmatism.

For example, the treatment portion 118 of the contact lens 110 may include a width 156 and/or diameter 166 of approximately 5.0 mm to 7.5 mm. In other implementations, the treatment portion 118 may include a width 156 and/or diameter 166 of approximately 5.0 mm to 5.5 mm, 5.5 mm to 6.0 mm, 6.0 mm to 6.5 mm, 6.5 mm to 7.0 mm, 7.0 mm to 7.5 mm, or greater or other ranges therebetween. In some implementations (such as is shown in FIGS. 3A and 3B), the treatment portion 118 has a radius of curvature of approximately 6.5 to 9.5 mm and has a diopter reading of approximately 52.00 Diopter (6.5 mm) to 35.50 Diopter (9.5 mm). In other implementations, the radius of curvature of the treatment portion 118 of the contact lens 110 is approximately 6.5 mm to 7.5 mm, 7.5 mm to 8.5 mm, 8.5 mm to 9.5 mm, or greater or other ranges therebetween. In some implementations, the diopter reading of the treatment portion 118 of the contact lens 110 is approximately 52.0 to 48.0, 48.0 to 45.0, 45.0 to 40.0, 40.0 to 35.0, and/or greater or other ranges therebetween.

The treatment portion 118 (and/or the first staining feature 142) may apply pressure on tear film that lies between an interior surface 122 of the contact lens 110 and the cornea of the eye when worn by the patient, which helps to reshape the cornea. Reshaping the cornea may create a decrease in corneal sagittal height, thereby causing the cornea to become more spherical and reducing or eliminating the astigmatism in the eye. The treatment portion 118 being steeper than other contact lenses may help to encourage and/or otherwise allow the epithelial cells to migrate from the periphery of the eye towards the pupil of the eye. As noted above, the pressure caused by the epithelial cells migrating along the cornea may be relieved by the reverse portion 116.

As noted above, staining features may be formed between adjacent portions of the contact lens 110. The staining features may form convex features that contact the cornea (or tears/cells formed between the cornea and the contact lens) to apply pressure to particular portions of the cornea. The applied pressure helps to reshape the patient's cornea, thereby treating high cylinder astigmatism. The contact lens 110 may include one, two, three, four, five, six, or seven or more staining features (or contact points) to desirably apply pressure to the cornea to reshape the cornea. The staining features described herein may be desirably shaped and located to provide a staining pattern across the entire cornea of the patient.

As shown in FIGS. 3A-3B, the first staining feature 142 may be formed between the treatment portion 118 and the reverse portion 116, the second staining feature 144 may be formed between the reverse portion 116 and the alignment portion 114, the third staining feature 146 may be formed between the alignment portion 114 and the peripheral portion 112, and the fourth staining feature 148 may be formed at the end of the peripheral portion 112. The first, second, third, and fourth staining features 142, 144, 146, 148 may each contact the cornea to reshape the cornea, thus beneficially staining the patient's cornea across the entire cornea (and contact lens 110), or at least a portion of the diameter of the cornea and/or contact lens 110.

An example of a staining pattern 170 caused by the contact between the first, second, third, and fourth staining features 142, 144, 146, 148 and the patient's cornea is shown in FIGS. 4A and 4B. As shown in FIGS. 4A-4B, the staining pattern 170 may include a ribbon shape, indicating that pressure is being applied by the contact lens 110 to the cornea along the entire cornea (and across the entire contact lens diameter). In some implementations, a greater amount of pressure is applied by at least the first staining feature 142, the second staining feature 144, and/or the fourth staining feature 148.

As shown, the ribbon pattern may include two identical pressure patterns applied to the cornea on opposing sides of the pupil. The staining pattern 170 in which pressure is applied by the contact lens 110 described herein at least four points along each side of the pupil (e.g., via a ribbon shaped staining pattern) may beneficially more effectively, efficiently, and stably reshape the patient's cornea to thereby treat high cylinder astigmatism, among other ocular disorders. For example, the ribbon-shaped staining pattern may indicate that the contact lens 110 is applying more pressure at the high astigmatic zones, which further helps to more effectively, efficiently, and stably reshape the patient's cornea to thereby treat high cylinder astigmatism In some implementations, a method is provided for treating ocular disorders, such as high cylinder astigmatism. The method may include providing the contact lens 110 described herein. In some implementations, the method may additionally and/or alternatively include sizing and/or shaping the contact lens 110 (or one or more portions thereof) based on one or more factors described herein. In some implementations, the method may also include applying the contact lens 110 to an eye of a patient.

Terminology

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A contact lens for shaping a cornea of an eye of a patient to treat high cylinder astigmatism, the contact lens comprising:
 a first portion configured to cause migration of epithelial cells from a periphery of a cornea of the eye of the patient towards a center of the cornea of the eye of the patient, the first portion extending from an outer edge of the contact lens;
 a second portion configured to cause migration of the epithelial cells from the center of the cornea towards the periphery of the cornea, the second portion being positioned at a center of the contact lens; and
 a staining feature positioned along a third portion of the contact lens between the first portion and the second portion, the staining feature configured to contact the cornea, thereby reshaping the cornea to treat high cylinder astigmatism, wherein the staining feature is configured to apply a ribbon-shaped staining pattern to the cornea across a diameter of the contact lens.

2. The contact lens of claim 1, wherein the first portion and the second portion are concave.

3. The contact lens of claim 2, wherein the staining feature is convex.

4. The contact lens of claim 1, wherein the staining feature includes at least two staining features.

5. The contact lens of claim 4, wherein the at least two staining features comprises:
   a first staining feature positioned at the outer edge of the contact lens; and
   a second staining feature positioned at an end of the second portion.

6. The contact lens of claim 1, wherein at least a portion of the contact lens between the third portion and the second portion is configured to collect an excess of migrated epithelial cells to relieve pressure caused by the contact between the staining feature and the cornea.

7. The contact lens of claim 1, wherein the first portion, the second portion, and the third portion are integrally formed.

8. The contact lens of claim 1, wherein the contact lens comprises opposing first portions and opposing third portions, wherein the opposing first portions and the opposing third portions are positioned on opposite sides of the second portion, and each of the opposing first portions and each of the opposing third portions are mirror images of one another about a central axis that extends through a center of the second portion.

9. The contact lens of claim 1, wherein a width of the first portion is approximately 0.1 mm to 0.5 mm, a radius of curvature of the first portion is approximately 10.0 mm to 13.5 mm, and a Diopter reading of the first portion is approximately 33.75 Diopter to 25 Diopter.

10. The contact lens of claim 1, wherein a width of the second portion is approximately 5.00 mm to 7.50 mm, a radius of curvature of the second portion is approximately 6.5 mm to 9.5 mm, and a Diopter reading of the second portion is approximately 52.00 Diopter to 35.50 Diopter.

11. A method of treating high cylinder astigmatism, the method comprising:
   providing a contact lens for shaping a cornea of an eye of a patient to thereby treat the high cylinder astigmatism, the contact lens comprising:
      a first portion configured to cause migration of epithelial cells from a periphery of a cornea of the eye of the patient towards a center of the cornea of the eye of the patient, the first portion extending from an outer edge of the contact lens;
      a second portion configured to cause migration of the epithelial cells from the center of the cornea towards the periphery of the cornea, the second portion being positioned at a center of the contact lens; and
      a staining feature positioned along a third portion of the contact lens between the first portion and the second portion, the staining feature configured to contact the cornea, thereby reshaping the cornea to treat high cylinder astigmatism, wherein the staining feature is configured to apply a ribbon-shaped staining pattern to the cornea across a diameter of the contact lens.

12. The method of claim 11, wherein the first portion and the second portion are concave.

13. The method of claim 12, wherein the staining feature is convex.

14. The method of claim 11, wherein the staining feature includes at least two staining features.

15. The method of claim 14, wherein the at least two staining features comprises:
   a first staining feature positioned at the outer edge of the contact lens; and
   a second staining feature positioned at an end of the second portion.

16. The method of claim 11, wherein at least a portion of the contact lens between the third portion and the second portion is configured to collect an excess of migrated epithelial cells to relieve pressure caused by the contact between the staining feature and the cornea.

17. The method of claim 11, wherein the first portion, the second portion, and the third portion are integrally formed.

18. The method of claim 11, wherein the contact lens comprises opposing first portions and opposing third portions, wherein the opposing first portions and the opposing third portions are positioned on opposite sides of the second portion, and each of the opposing first portions and each of the opposing third portions are mirror images of one another about a central axis that extends through a center of the second portion.

19. The method of claim 11, wherein a width of the first portion is approximately 0.1 mm to 0.5 mm, a radius of curvature of the first portion is approximately 10.0 mm to 13.5 mm, and a Diopter reading of the first portion is approximately 33.75 Diopter to 25 Diopter.

20. The method of claim 11, wherein a width of the second portion is approximately 5.00 mm to 7.50 mm, a radius of curvature of the second portion is approximately 6.5 mm to 9.5 mm, and a Diopter reading of the second portion is approximately 52.00 Diopter to 35.50 Diopter.

* * * * *